(12) United States Patent
McCorkell

(10) Patent No.: US 9,243,657 B2
(45) Date of Patent: Jan. 26, 2016

(54) FASTENER RETAINING DEVICE

(71) Applicant: Magna Closures Inc., Newmarket, CA (US)

(72) Inventor: John P. McCorkell, Orillia, CA (US)

(73) Assignee: Magna Closures Inc., Newmarket (CA)

( * ) Notice: Subject to any disclaimer, the term of this patent is extended or adjusted under 35 U.S.C. 154(b) by 0 days.

(21) Appl. No.: 14/333,722

(22) Filed: Jul. 17, 2014

(65) Prior Publication Data
US 2014/0328644 A1 Nov. 6, 2014

Related U.S. Application Data

(63) Continuation of application No. PCT/CA2013/000030, filed on Jan. 17, 2013.

(60) Provisional application No. 61/587,286, filed on Jan. 17, 2012.

(51) Int. Cl.
*F16B 39/00* (2006.01)
*F16B 39/02* (2006.01)
(Continued)

(52) U.S. Cl.
CPC .............. *F16B 39/02* (2013.01); *B60J 5/0468* (2013.01); *F16B 41/002* (2013.01); *F16B 37/0842* (2013.01)

(58) Field of Classification Search
CPC .... F16B 39/02; F16B 37/0842; F16B 5/0208; F16G 41/002; B60J 5/0468
See application file for complete search history.

(56) References Cited

U.S. PATENT DOCUMENTS 5,419,714 A * 5/1995 Nagamine ..................... 439/364
5,536,124 A 7/1996 Silva
(Continued)

FOREIGN PATENT DOCUMENTS

| DE | 4131779 A1 | 3/1993 |
|----|------------|--------|
| DE | 202005014924 U1 | 1/2006 |
| EP | 1096156 B1 | 5/2005 |

OTHER PUBLICATIONS

International Search Report and Written Opinion dated Apr. 3, 2013 issued from the Canadian Intellectual Property Office relating to PCT International Application No. PCT/CA2013/000030.
(Continued)

*Primary Examiner* — Gary Estremsky
(74) *Attorney, Agent, or Firm* — Grant Tisdall; Gowling Lafleur Henderson LLP

(57) ABSTRACT

An integrally molded object body is disclosed for retaining fasteners in a pre-attachment position and deforming to accommodate attachment tolerances. The object body has a fastener retaining portion that has an aperture defined therein that has a fastener-engaging edge that grips the shaft of the fastener in the pre-attachment position. The fastener retaining is deformable to allow the fastener to move laterally and be attached off-center from the pre-attachment position to accommodate attachment tolerances. The fastener retaining portion can have areas of weakness to allow deformation. These areas of weakness can comprise areas of reduced thickness or radial extensions that extend towards the perimeter of the fastener retaining portion. The object body also has a clearance portion that defines a mounting face that the fastener does not extend past in the pre-attachment position. The object body can further comprise a compression portion that engages with the shoulder of the fastener and is compressed between the shoulder the object that the object body is attached onto in the attachment position. The compression portion can also have a bushing that provides increased torque retention by engaging with the fastener shoulder and the object that the object body is attached onto.

15 Claims, 10 Drawing Sheets

(51) Int. Cl.
  *B60J 5/04*   (2006.01)
  *F16B 41/00*  (2006.01)
  *F16B 37/08*  (2006.01)

(56) References Cited

U.S. PATENT DOCUMENTS

| | | | |
|---|---|---|---|
| 6,357,953 B1 | 3/2002 | Ballantyne | |
| 6,862,846 B1* | 3/2005 | Kirejczyk | 49/502 |
| 7,959,214 B2 | 6/2011 | Salhoff | |
| 8,061,947 B2 | 11/2011 | Van Tiem et al. | |
| 8,393,986 B2* | 3/2013 | Young | 474/101 |
| 2005/0198761 A1 | 9/2005 | Baskerville et al. | |
| 2008/0115419 A1* | 5/2008 | Karumuri | 49/501 |
| 2008/0219758 A1 | 9/2008 | Jatzke | |
| 2008/0276541 A1* | 11/2008 | Roy et al. | 49/502 |
| 2009/0197724 A1 | 8/2009 | Young | |
| 2010/0260578 A1 | 10/2010 | Ullein | |

OTHER PUBLICATIONS

Supplementary European Search Report dated Jul. 10, 2015 issued from the European Patent Office relating to corresponding European Application No. 13738404.6.

Extended European Search Report dated Jun. 23, 2015 issued from the European Patent Office relating to European Application No. 13738404.6.

* cited by examiner

FASTENER RETAINING DEVICE

CROSS-REFERENCE TO RELATED APPLICATIONS

This application is a continuation application of PCT International Patent Application No. PCT/CA2013/000030 filed Jan. 17, 2013 which claims the benefit of U.S. Provisional Application 61/587,286, filed Jan. 17, 2012, the entirety of which is incorporated herein by reference.

FIELD

The present disclosure relates generally to automobile assembly, more particularly to fasteners and devices to retain the fastener in a pre-attachment position. The disclosure also relates to modular assemblies for vehicles that use a carrier component that is attached to the vehicle.

BACKGROUND

The current trend in the automobile manufacturing sector, as described in U.S. Pat. No. 7,743,559 to Papi et al. and incorporated by reference herein, is to group components to obtain modular systems that simplify and facilitate mounting instead of mounting individual elements separately. One example of this type of modular system is to assemble hardware components onto a carrier panel that is then mounted to the vehicle on the assembly line. For example, a door carrier can have several accessories or functional components of the door pre-mounted, such as elements of the window lift, the lock, impact absorption systems, loudspeakers, etc. On the assembly line the door carrier is attached to the door to facilitate the final assembly of the vehicle and reduces the assembly times. Therefore, the use of this type of modular carrier simplifies the assembly of the functional components, as these components are pre-mounted on a single carrier that can be mounted on the vehicle in a single assembly stage.

Attachment of the carrier to the vehicle involves assembly line workers handing, inserting and seating every fastener for the carrier. For a typical door carrier this can involve handling 8 to 12 attachment screws for each carrier. Handling and insertion of fasteners increases the line time involved for installing components, particularly carriers. The potential for dropping or mishandling fasteners can cause delays that decrease the productivity of the entire assembly line.

SUMMARY

Accordingly, there is provided an object to be fastened by a fastener, the fastener having a shaft with a longitudinal axis and having a shoulder extending outwardly from the longitudinal axis beyond the shaft. The object comprises an integrally moulded object body having a fastener retaining portion and a fastener clearance portion. The fastener retaining portion defines an aperture to engage the fastener shaft, the aperture having at least one fastener-engaging edge for retaining the fastener in a pre-attachment position. The fastener retaining portion is deformable to allow the longitudinal axis of the fastener to move from the pre-attachment position laterally into the fastener retaining portion. The fastener clearance portion is spaced about the fastener retaining portion and extends longitudinally away from the fastener retaining portion to provide a mounting face 137 that defines a plane that the fastener does not extend past in the pre-attachment position. In some aspects, the aperture can have at least two opposing fastener-engaging edges.

In some aspects, the integrally moulded object body further comprises a compression portion that is spaced about the fastener retaining portion such that the fastener compression portion engages the fastener shoulder as the fastener is inserted longitudinally, the compression portion having a first thickness greater than a second thickness of the fastener retaining portion. In some aspects, the fastener clearance portion can have a third thickness that is the same as the first thickness of the compression portion. In yet other aspects, the fastener compression portion and fastener clearance portion can be the same portion.

In still other aspects, the compression portion can comprise a partially overmoulded bushing exposed on one surface toward the shoulder of the fastener and on an opposing surface. The bushing has a greater compressive strength than an overmould material of the integrally moulded object body to provide increased torque retention. In related aspects, the bushing can be shaped to allow for the flow through of overmould material.

In some aspects, the fastener retaining portion can have areas of weakness to provide for deformation of the fastener retaining portion. The fastener retaining portion can include one or more radial extensions that extend outwards towards a perimeter. The radial extensions can be cutouts through the central portion or a series of perforations through the fastener retaining portion. The radial extensions can be contiguous or non-contiguous with the aperture.

According to another aspect, the object is a first vehicle component for attachment to a second vehicle component during vehicle assembly, the first vehicle component having a plurality of fastener retaining portions and a corresponding plurality fastener clearance portions. For example, the first vehicle component can be a door carrier plate and the second vehicle component can be a door inner panel. The first vehicle component can have fasteners in the pre-attachment position in each of the fastener-retaining portions. The diameter of the fastener retaining portions can correspond with the off-center tolerances of the corresponding holes in the second vehicle component.

BRIEF DESCRIPTION OF THE DRAWINGS

For a better understanding of the various embodiments described herein and to show more clearly how they may be carried into effect, reference will now be made, by way of example only, to the accompanying drawings which show at least one exemplary embodiment, and in which.

DESCRIPTION OF VARIOUS EMBODIMENTS

Figure 1:
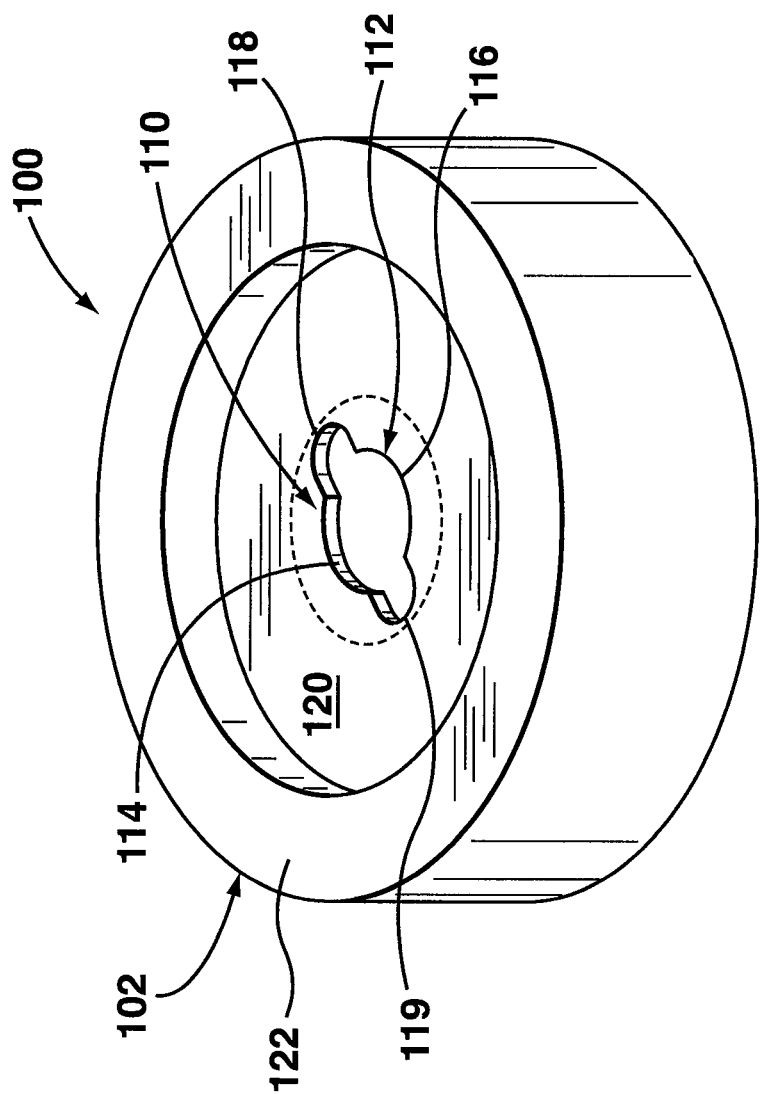
FIG. 1 is a perspective view of an embodiment of a fastener-retaining device.

It will be appreciated that for simplicity and clarity of illustration, where considered appropriate, numerous specific details are set forth in order to provide a thorough understanding of the exemplary embodiments described herein. However, it will be understood by those of ordinary skill in the art that the embodiments described herein may be practiced without some of these specific details. In other instances, well-known methods, procedures and components have not been described in detail so as not to obscure the embodiments described herein.

The term "fastener" as used herein refers a piece of hardware for mechanically attaching two or more objects together. Preferably, the fastener is a threaded fastener that has a helical ridge wrapped around the external cylindrical shaft, such as a screw or a bolt, for example, but other fastener variations may be used as known to a person skilled in the art. The term "nut" is also used to refer to an object that mates with the fastener to provide attachment. Preferably, the nut comprises an internal helical thread that mates with the fastener but other variants known to a person skilled in the art can be used.

Reference is now made to the FIGS. 1-5 that illustrate a fastener-retaining device 100 having a body 102 with a fastener retaining portion 110 having an aperture 112 defined therein. Fastener retaining 110 is larger than the diameter of a fastener shaft 220 and can yield to allow positioning of fastener 200 almost anywhere within the fastener retaining portion 110 to account for manufacturing tolerances. Body 102 of fastener retaining device 100 can be integrally moulded into the object that is to be fastened.

Figure 3:
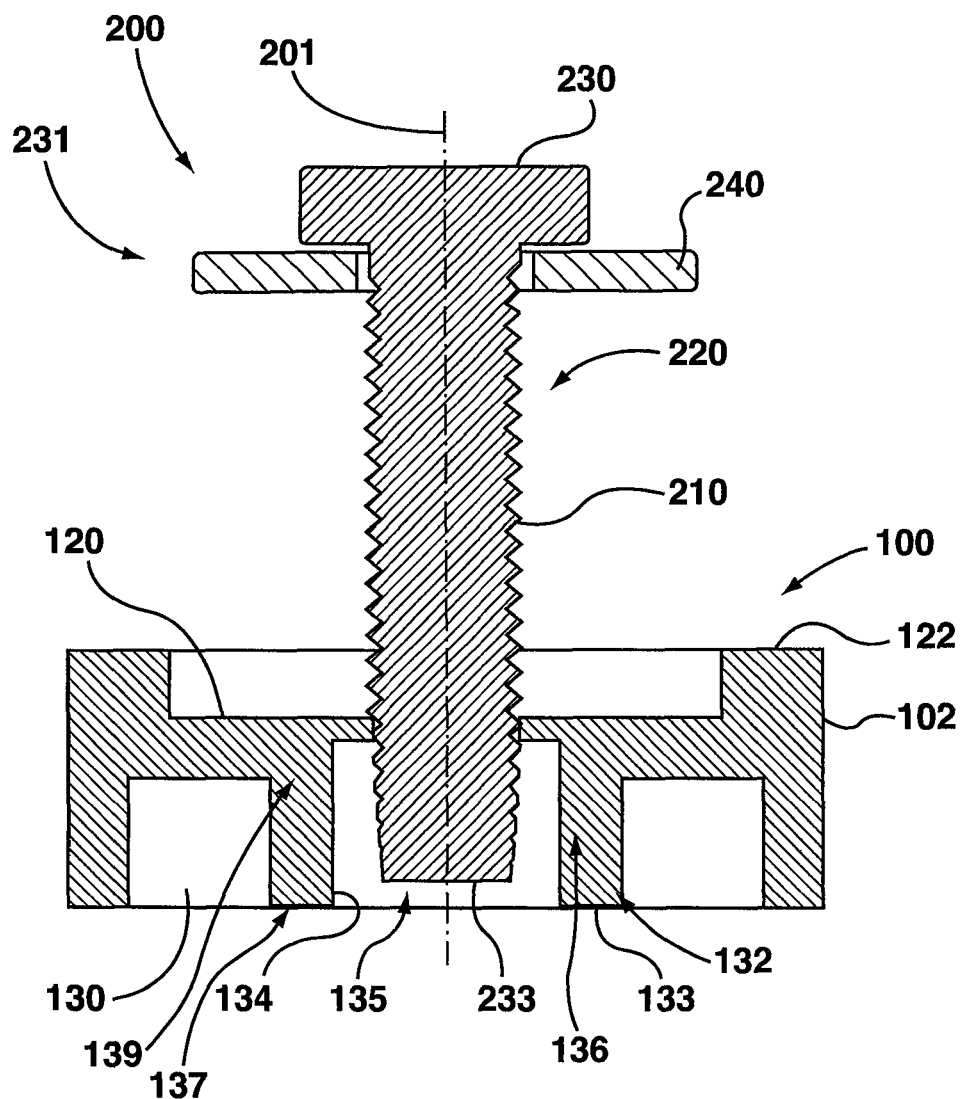
FIG. 3 is a cross section through the center of the embodiment of FIG. 1 further including a fastener in a pre-attachment position.
Figure 4:
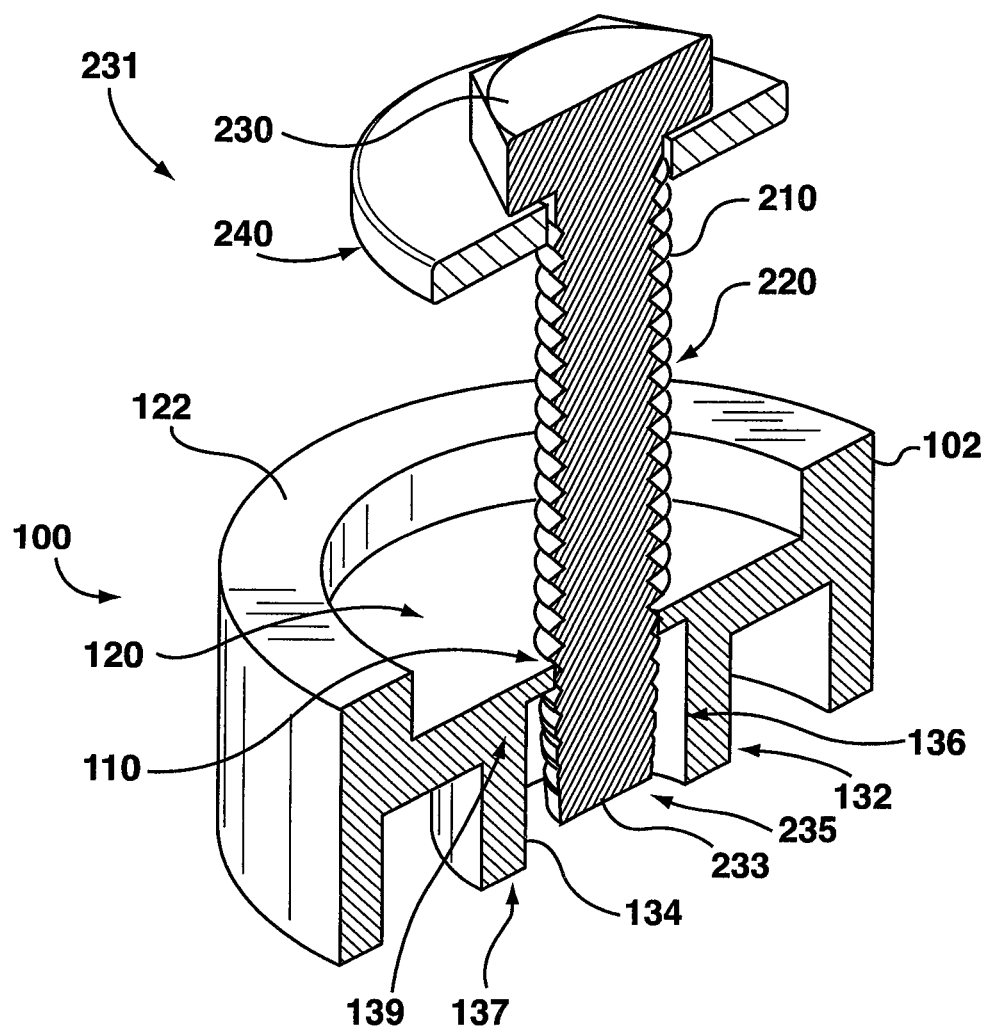
FIG. 4 is a perspective view of the cross section of the embodiment of FIG. 3.

Aperture 112 retains a fastener 200 in a pre-attachment position by engaging a fastener shaft 220 inserted through aperture 112 as shown in FIG. 3, for example. Aperture 112 of fastener retaining portion 110 allows fastener 200 to be positioned in advance of installation of a part having fastener-retaining device 100. Fastener 200 has a shaft 220 with a longitudinal axis 201 and a shoulder 231 that extends outwardly from the longitudinal axis 201. The shoulder 231 can be formed from the fastener head 230 or a washer 240. The pre-attachment position has fastener 200 placed within aperture 112 ready to be torqued by a nut runner as shown in FIGS. 3 and 4. During installation, fastener 200 is torqued to threadingly engage with nut 250 until the shoulder 231 of fastener 200 (e.g. head 230 or washer 240) engages a top surface 120 of fastener-retaining device 100. Fastener-retaining device 100 allows positioning fastener 200 in a pre-attachment position through shipping until fastening to allow for a much more efficient installation process on the assembly line.

Fastener retaining portion 110 and aperture 112 can deform to engage and retain fastener shaft 220 in the pre-attachment position shown in FIGS. 3 and 4. Aperture 112 is shaped to engage fastener shaft 220 to retain fastener 200 in the pre-attachment position. Shape of aperture 112 and thickness of fastener retaining portion 110 can control the force to retain fastener 200, and is preferably designed to yield to force of the torqueing tool, such as a nut runner typically used in auto assembly.

Figure 2:
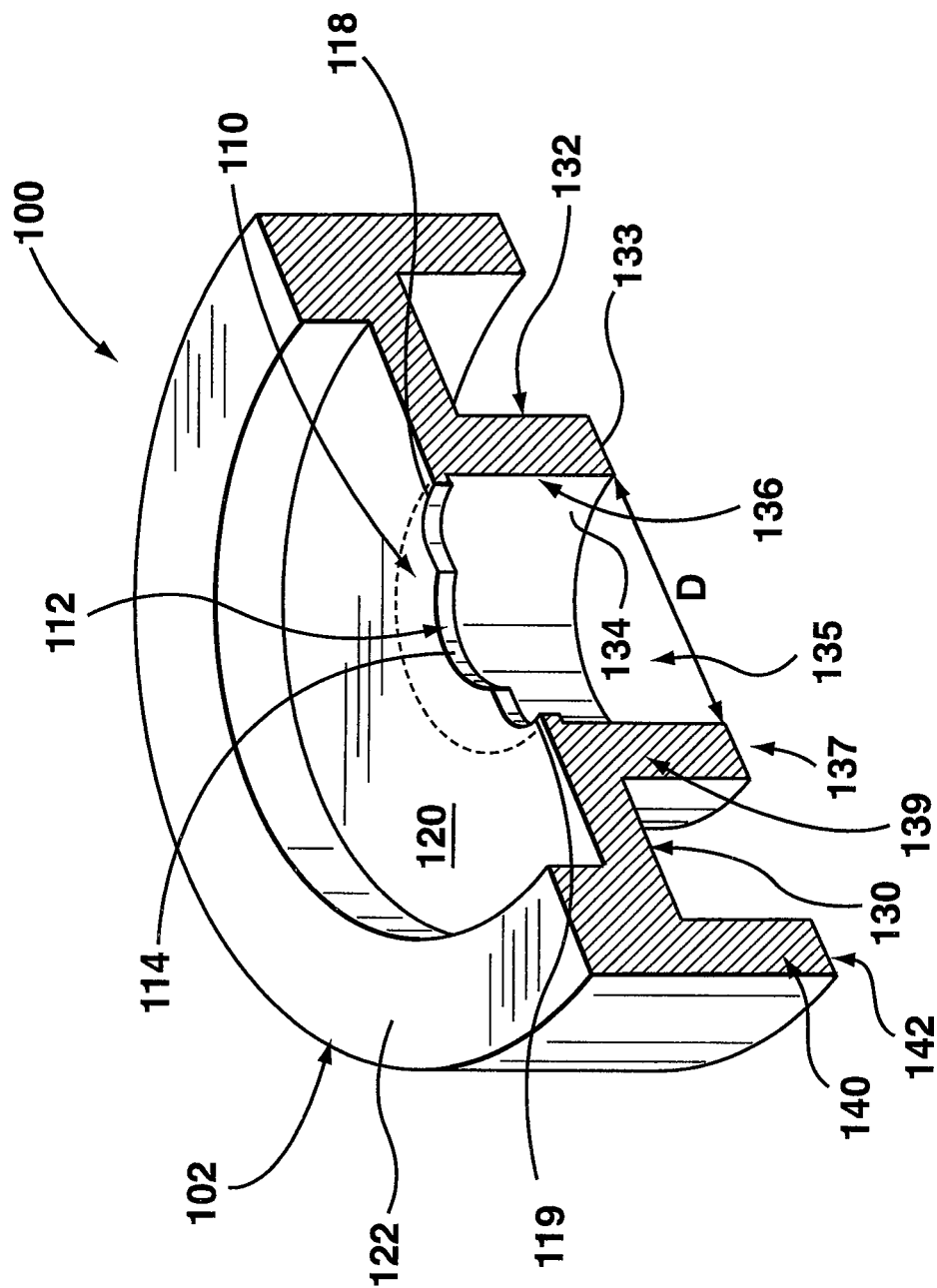
FIG. 2 is a perspective view of a cross-section through the center of the embodiment of FIG. 1.

Shape of aperture 112 can also provides for initial threading of fastener 200 to assist retaining fastener 200 at the appropriate height. In some embodiments, aperture 112 can have a single continuous engagement edge (e.g. a rounded or circular aperture shape) that engages fastener shaft 220 in a pre-attachment position. Aperture 112 can have at least two opposing engagement edges, such as engagement edges 114 and 116 as shown in FIGS. 1 and 2, that engage threads 210 of fastener shaft 220. Engagement edges can be directly opposing, as illustrated, or aperture 112 could define an odd number of opposing engagement edges, such as three, for example, that can be oriented as an equilateral triangle with each edge engaging the threads 210 of fastener shaft 220.

Fastener retaining portion 110 can have areas of weakness to assist with deformation. In some embodiments, areas of weakness can have a reduced thickness to allow crushing or deformation of fastener retaining portion 110. As illustrated in the cross section of fastener-retaining device 100 shown in FIGS. 2-5, fastener retaining portion 110 can have a reduced thickness relative to body 102 to facilitate deformation or crushing of fastener retaining portion 110 when attaching fastener 200. Thickness of areas of weakness controls the yield force for adjusting the position of fastener 200 away from central axis 101 of fastener retaining portion 110.

Figure 5:
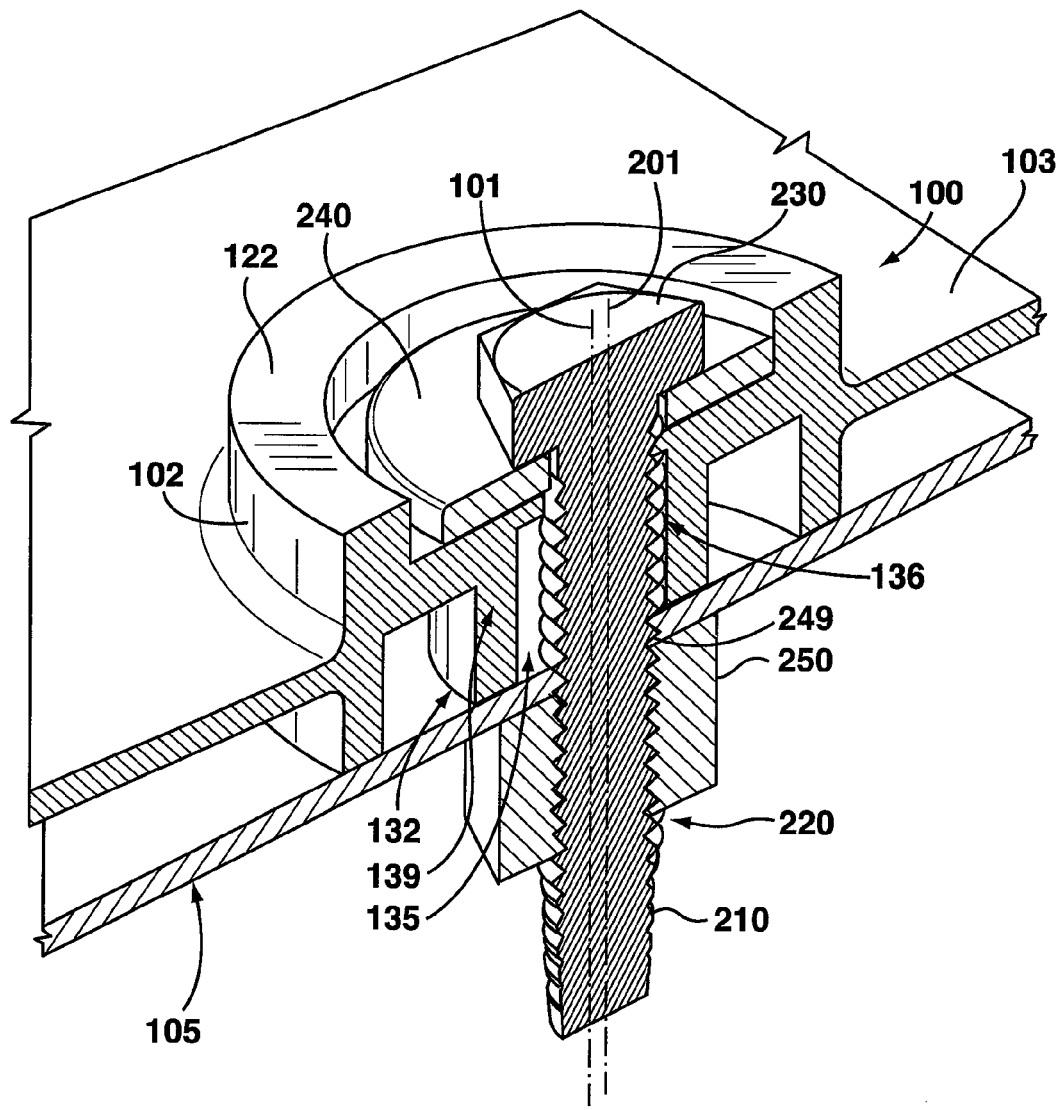
FIG. 5 is a perspective view of a cross section of an embodiment of the fastener-retaining device showing the fastener engaged with a nut in an off-center attachment position.

Fastener retaining portion 110 can also define areas of weakness by having one or more radial extensions 118 and 119 that are cutouts that extend towards the outer perimeter of fastener retaining portion 110. Radial extensions 118 and 119 allow fastener retaining portion 110 to deform during attachment of fastener 200 to allow longitudinal axis 201 of fastener 200 to move off-center of aperture 112 in fastener retaining portion 110. For example, FIG. 5 illustrates longitudinal axis 201 of fastener 200 moved laterally from central axis 101 through center of fastener retaining portion 110 to accommodate position of nut 250. Radial extensions 118 and 119 can be cutouts that are preferably narrower than the width defined by opposing engagement edges 114 and 116. Radial extensions 118, 119 can be either contiguous with aperture 112, as shown, or non-contiguous with aperture 112 (e.g. the radial extensions do not extend into aperture).

In other embodiments, radial extensions can be used to provide for easy separation of two sections of fastener retaining portion 110 due to the fastening forces perpendicular to longitudinal axis 201 of fastener 200. Separating two sections of fastener retaining portion 110 is another mode of deformation of fastener retaining portion 110. For example, radial extension can be implemented as narrow slits, perforations or lines of reduced thickness that allows fastener shaft to separate two sections of fastener retaining portion 110. These structures allow two sections of fastener retaining portion 110 to separate to allow the longitudinal axis 201 of fastener 200 to move laterally from the pre-attachment position.

In other embodiments, fastener retaining portion 110 can have multiple radial extensions to allow for easy deformation of fastener retaining portion 110 to accommodate off-center positioning of longitudinal axis of fastener 200. In some embodiments, such as that illustrated in FIG. 8, radial extensions can be a number of narrow slits that extend outwards from the center of aperture 112 towards the perimeter of fastener retaining portion 110.

Fastener retaining portion 110 is preferably circular and has a diameter larger than fastener shaft 220 to provide a tolerance for positioning fastener 200 within fastener retaining portion 110 when in the attached position. The radius of fastener retaining portion 110 should be selected based on the tolerances of the hole or nut 250 position. Fastener retaining portion 110 can have other shapes that accommodate this tolerance within the shape. For example, fastener retaining portion 110 could be square so long as the tolerance radius is incorporated therein.

Other shapes of fastener retaining portion 110 can be used to limit the tolerance to only one or two directions. These shapes can be defined by areas of weakness of fastener retaining portion 110. For example, fastener retaining portion 110 can only allow deformation in a + shape to limit tolerance to two perpendicular directions. Alternatively, fastener retaining portion 110 can allow deformation in a single direction.

Body 102 of fastener-retaining device 100 comprises a fastener clearance portion 136 that is spaced about the fastener retaining portion 110. The fastener clearance portion 136 extends longitudinally away from the fastener retaining portion to provide a mounting face 137 that engages the object to which body 102 is being attached onto. The fastener does not extend past the plane defined by the mounting face 137 in the pre-attachment position.

An example of fastener clearance portion 136 can be illustrated by extension 132 that extends from bottom surface 130 of body 102 that defines an inner bore 135 having a diameter greater than fastener shaft 220. The end 133 of extension 132 can provide a mounting face 137. An alternate example of fastener clearance portion 136 can include outer ring 140 extending from bottom surface 130 of body 102 that has an end portion 142 that could also serve as a mounting face 137. Mounting face 137 can assist to position fastener 200 in the pre-attachment position such that end 233 of fastener 200 does not extend past mounting face 137 defined by either cylindrical extension 132 or outer ring 140.

Top surface 120 of body 102 of fastener-retaining device 100 can define a countersink or counterbore to allow head 230 of fastener 200 to be at least partially recessed with respect to top-most surface 122 of fastener-retaining device 100. Alternatively, as illustrated by FIG. 5, a counterbore can allows washer 240 to be recessed so long as the counterbore has a large enough diameter to accommodate positional tolerances.

Body 102 of fastener-retaining device 100 further comprises a compression portion 139 that is spaced about fastener retaining portion 110 such that the shoulder 231 (e.g. head 230 or washer 240) of fastener 200 engages the compression portion 139 as the fastener is inserted into the attachment position. The compression portion 139 transfers the force from the shoulder 231 of the fastener 200 to the object that body 102 is being attached onto. The compression portion 139 has thickness that is greater than fastener retaining portion 110. In the embodiment illustrated in FIGS. 1 to 5, compression portion 139 can comprise extension 132 between top surface 120 and end 133. In some embodiments, the compression portion 139 and the fastener clearance portion 136 can be the same, such as the extension 132 for example.

Reference is next made to FIG. 5 that illustrates body 102 of fastener-retaining device 100 integrally moulded with a first vehicle component 103 for attaching to a second vehicle component 105 having a hole 249 for receiving fastener 200. In some embodiments, hole 249 can be provided with a nut 250 for engaging the threads of fastener 200. First vehicle component 103 can be, for example, a carrier plate (e.g. a door carrier plate), a lifter plate, or another vehicle component such as rails of a plastic window regulator to be attached to a carrier plate or inner door panel. The second vehicle component 105 can be, for example, a part of the vehicle frame, a door inner panel, or other vehicle component.

Figure 6:
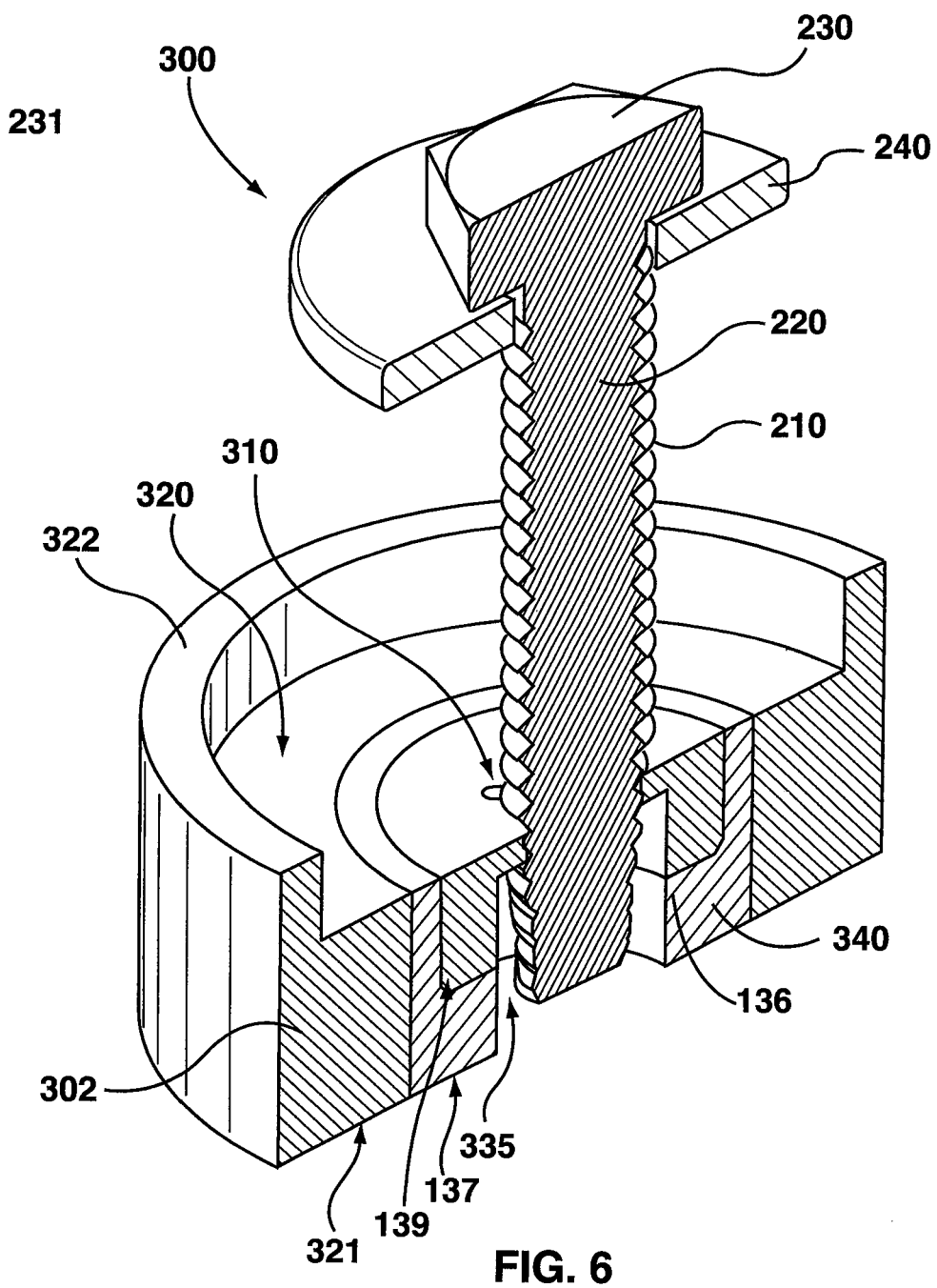
FIG. 6 is a perspective view of a cross section an alternative embodiment of a fastener retaining device having an internal metal bushing.

Reference is next made to FIG. 6 that illustrates a perspective view of a cross section of an alternative embodiment of a fastener-retaining device 300 having a bushing 340 in the fastener compression portion 139 that is exposed on top surface 320 and bottom surface 321 of body 302. Similar features of FIG. 6 are similarly numbered as those in FIGS. 1-5 and can provide a similar fastener-retaining function as described above. Fastener-retainer device 300 provides improved torque retention to fastener 200 by allowing bushing 340 to engage with shoulder 231 of fastener 200 in the attachment position.

The material of bushing 240 is comprised of a material with increased compressive strength compared to material of body 102 in order to improve torque retention. Bushing 240 provides improved compressive strength to retain the fastener under load over time. Preferably, bushing 340 is made of metal to provide metal-to-metal contact with shoulder 231 of fastener 200 and the second vehicle component that the first component is being attached onto. Bushing 240 can be composed, for example, from a wide range of steels or other metals. Other materials of sufficient compressive strength may also be used, such as carbon fiber composites from example.

Figure 7:
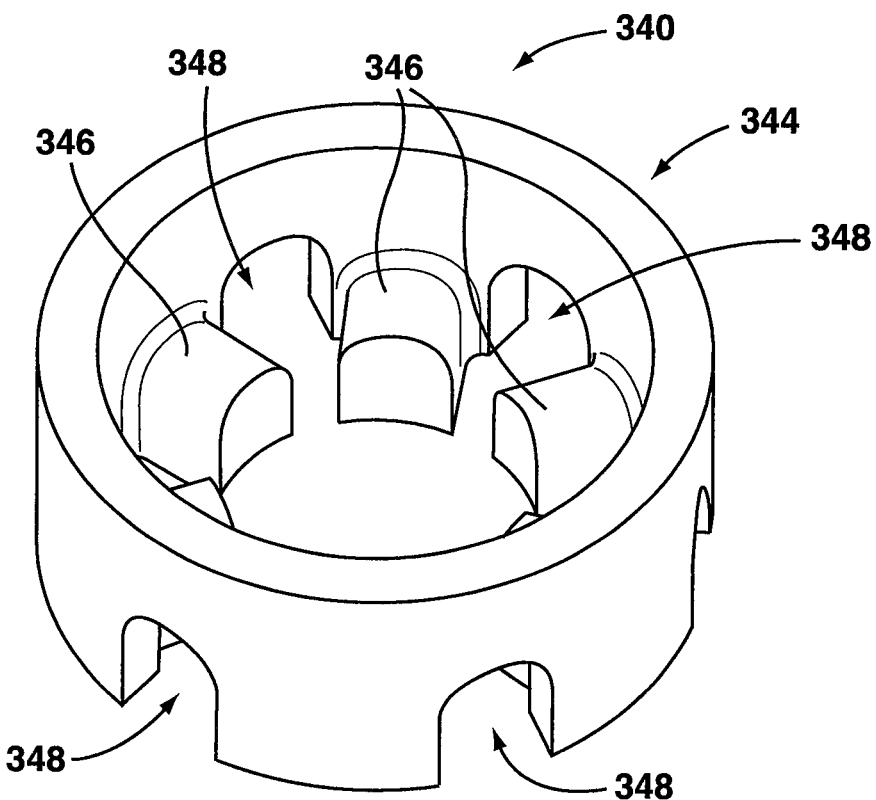
FIG. 7 is a perspective view of the metal bushing of the embodiment of FIG. 6.

FIG. 7 illustrates an embodiment of bushing 340 with body 302 removed to illustrate shape of bushing 340 to allow overmoulding. Bushing 340 can comprise an outer cylindrical ring 344 that has inward projections 346. Bushing 340 can also define cutouts 348 in outer cylindrical ring 344 that allow composite material of body 102 to flow through bushing 340 during the molding process.

Figure 8:
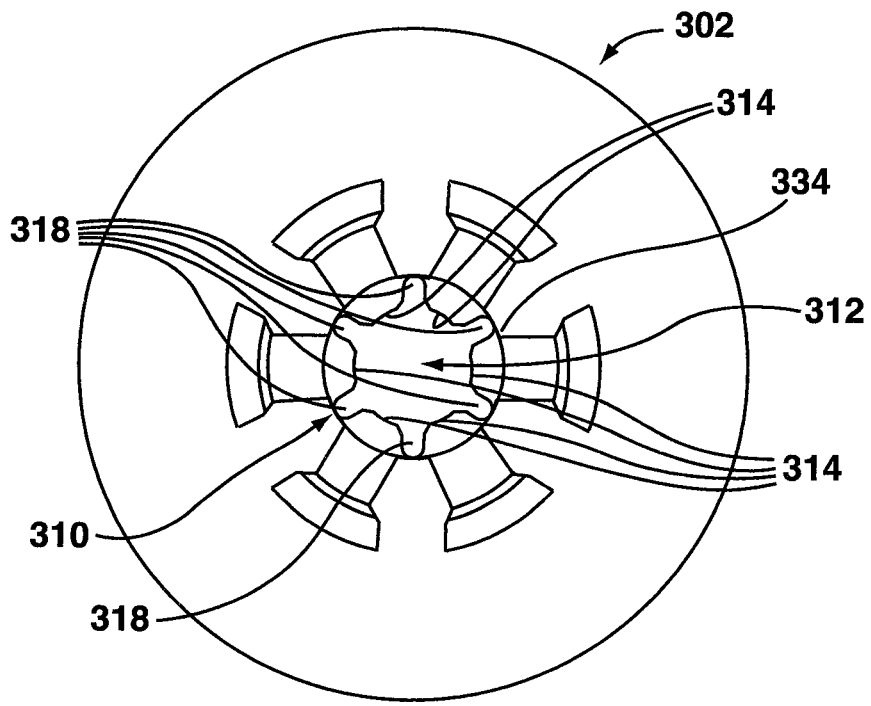
FIG. 8 is a bottom plan view of the body of the embodiment of FIG. 6 with the bushing removed.

Reference is next made to FIG. 8 which shows a bottom plan view of body 302 of fastener-retainer device 300 with bushing 340 removed. Material of body 302 is able to flow around bushing 340 as illustrated by conformal shape of body 302.

FIG. 8 also illustrates an alternative embodiment of fastener retaining portion 310 that includes a number of radial extensions 318 that extend outwards from aperture 312 towards perimeter of fastener retaining portion 310. Radial extensions 318 in fastener retaining portion 310 allow shaft 220 to move off-center laterally from aperture 312. Aperture 312 also has a number of engagement edges 314 that engage with threads 210 of fastener shaft 220 in order to retain fastener 200 in a pre-attachment position.

Figure 9:
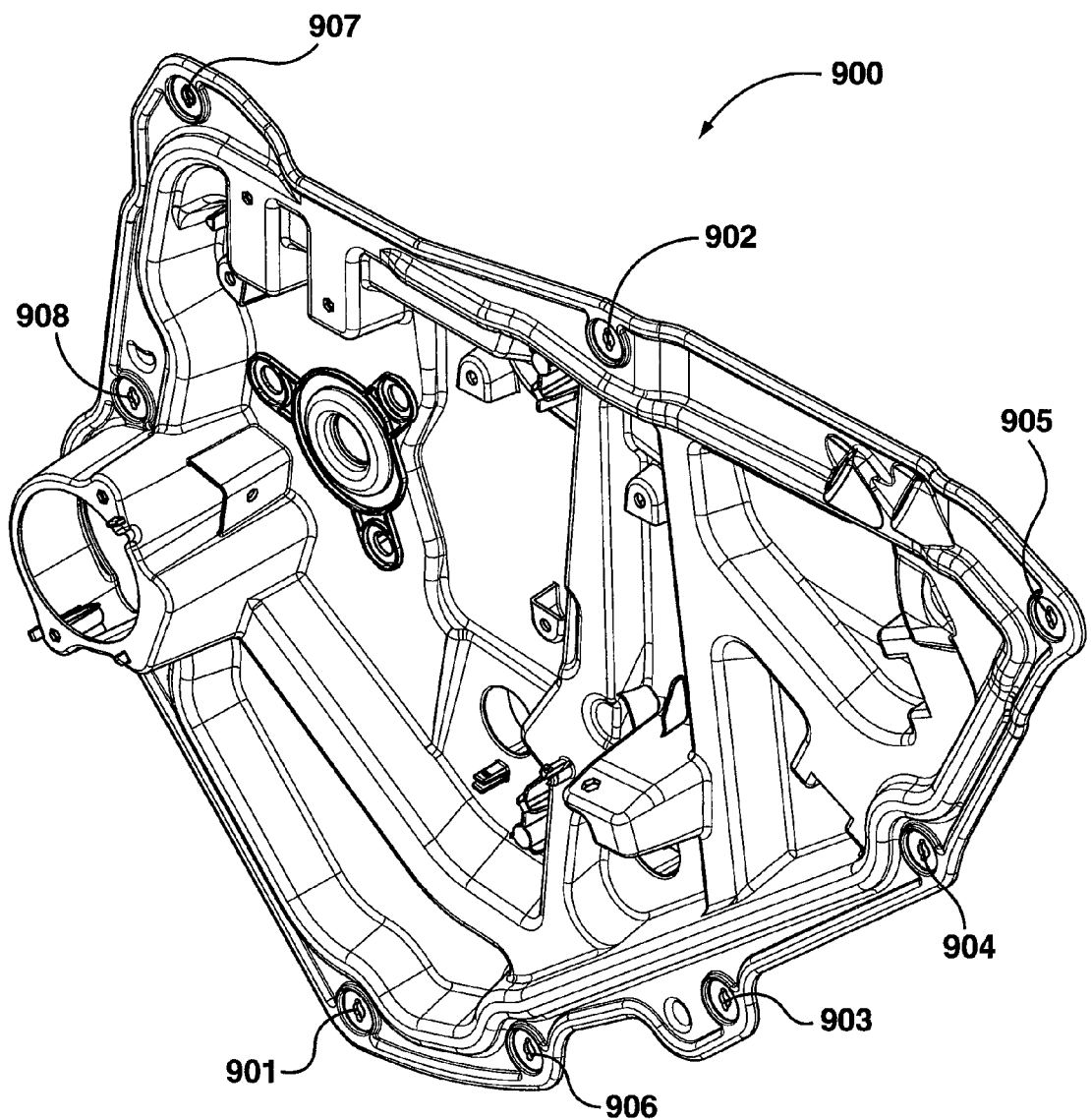
FIG. 9 is a perspective view of a door carrier panel having a plurality of fastener-retaining devices.

Reference is next made to FIG. 9 which illustrates a perspective view of a first vehicle component 900 having fastener-retaining devices 901-908 around the outer perimeter. The first vehicle component can be carrier plate as illustrated in FIG. 9. First vehicle component 900 can include fasteners 200 retained in each of fastener-retaining devices 901-908 so that first vehicle component 900 be placed into position with a corresponding second vehicle component and attached by torqueing fasteners 200. First vehicle component 900 of FIG. 9 is a door carrier plate that is designed for attachment to a door inner panel.

First vehicle component 900 can be manufactured to include a number of fastener-retaining devices 901-908 that can have their body 102 formed as embossments of first vehicle component 900. First vehicle component 900 is preferably manufactured from a composite material and molded into the desired shape. First vehicle component 900 can be molded to comprise embossments that define fastener-retaining devices 100 such as those described above. First vehicle component 900 can be manufactured using a number of composite materials to provide strength and low weight. For example, a door carrier plate is typically made from plastic, such as a polypropylene with 40% glass fill for structural reinforcement. Other composite materials will occur to those of skill in the art. Other reinforcement fibers contemplated include Kevlar, carbon fibers, and hemp, and other reinforcement materials will occur to those of skill in the art.

Fastener-retaining devices 901-908 can be integrally formed with first vehicle component 900 through the molding process. First vehicle component 900 can then be cut, drilled or trimmed as required. The term "integral", and it derivations, are used herein to indicate a part that is fabricated from a single piece of material. The term "integral" as used herein specifically excludes other means for maintaining parts fixed together as a single unit. More particularly, the term "integral" is used specifically exclude known variations for retaining a fastener in a pre-attachment position (e.g. using adhesives, separate mechanical retention device, etc.).

After first vehicle component 900 is molded and trimmed, other accessories and devices can be mounted to first vehicle component 900. For example, a door carrier plate can have several accessories or functional components of the door pre-mounted, such as elements of the window lift, the lock, impact absorption systems, loudspeakers, etc. Fasteners 200 can be positioned in a pre-attachment position into fastener-retaining devices 901-908. For example, fasteners 200 can be threaded into apertures 112 until end 233 of fastener 200 is flush with extension end 133 of cylindrical extension 132. Alternatively, apertures 112 can deform to allow fastener to simply be pushed through aperture 112 to retain fastener 200. First vehicle component 900 with attached accessories, functional components, and fasteners in a pre-attachment position can then be shipped to the vehicle assembly line for attachment to a corresponding second vehicle component.

The second vehicle component, such as door inner panel, for example, typically has holes with a nut welded thereto in order to attach the door carrier plate. The holes and welded nuts on the vehicle frame have a certain tolerance that the carrier plate must accommodate to firmly attach the carrier panel without warping or breaking the carrier plate. For example, door inner panel has holes that can have a true position of 3.0 mm in diameter that the door carrier panel accommodates with fastener-retaining devices 100 that have a fastener retaining portion 110 with a corresponding diameter that yields to allow movement of fastener 200. The fastener retaining portion 110 of each of the fastener-retaining devices 100 of the door carrier plate corresponds with the off-center tolerance of the corresponding hole and nut in the door module.

On the vehicle assembly line the first vehicle component 900 is received with the fasteners 200 in a pre-attachment position in fastener-retaining devices 100. The assembly line operator positions the first vehicle component to align the retained fasteners 200 with corresponding holes and nuts in the second vehicle component. Once the first vehicle component 900 is in position, the assembly line worker can begin torqueing the retained fasteners 200 with a nut runner in order to attach the first vehicle component 900 to the second vehicle component. For example, using a carrier plate with retained fasteners reduces handling of fasteners and the carrier plate resulting in a reduced line time.

The fastener retaining portion 110 of fastener-retaining devices 100 can deform to accommodate tolerances in the position of holes and nuts in the second vehicle component, such as the vehicle frame or an inner door panel. If the fastener 200 is positioned off-center from the hole/nut, fastener retaining portion 110 can deform to allow fastener 200 to be angled slightly for initial engagement with the threads of nut 250. Engaging the threads of an off-center nut 250 will provide a force perpendicular to central axis 101 applied by fastener shaft 220 against fastener retaining portion 110. Fastener retaining portion 110 will yield or deform to this force to allow longitudinal axis 201 of fastener 200 to be positioned off-center from central axis 101 of fastener retaining portion 110.

Figure 10:
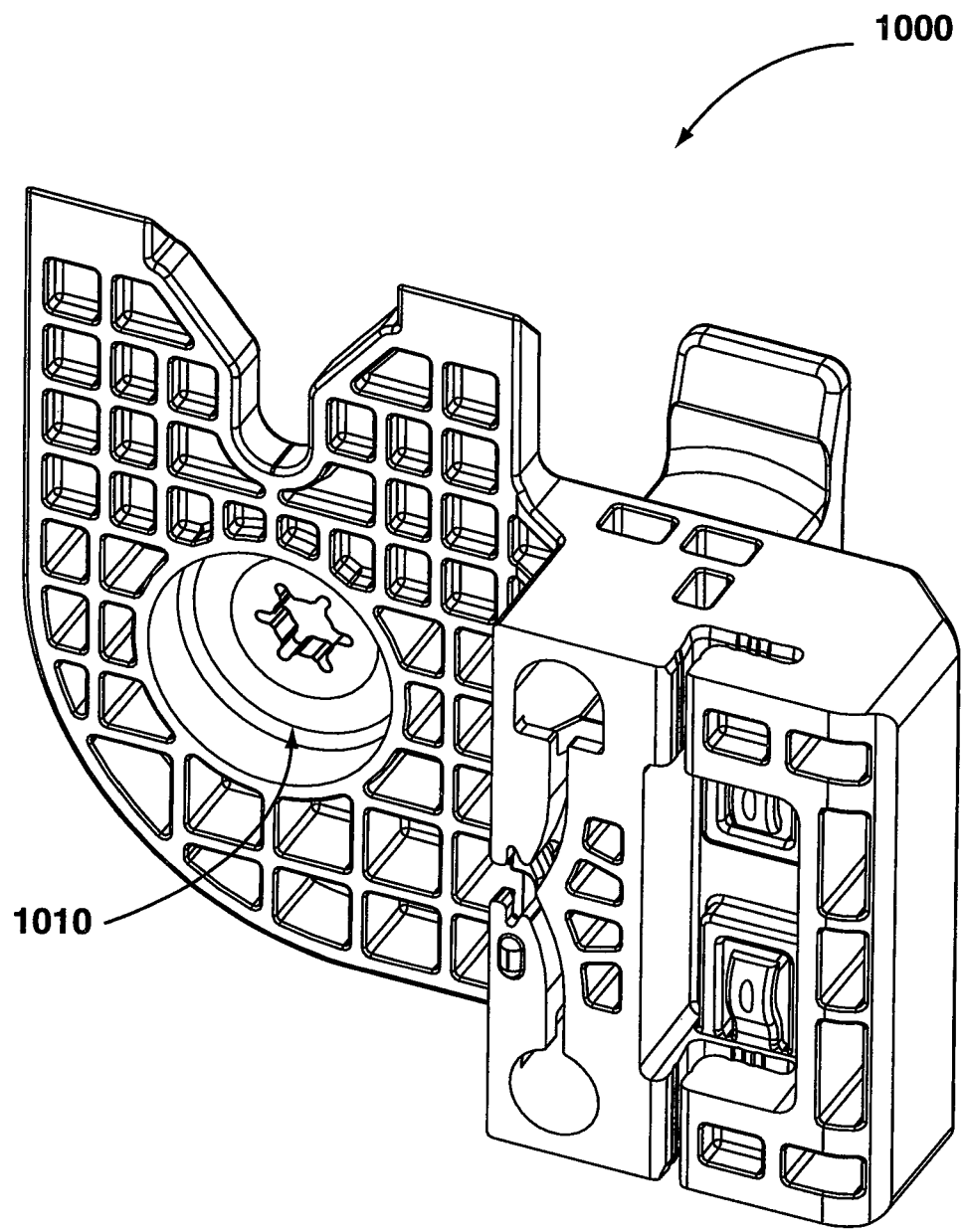
FIG. 10 is a perspective view of a window regulator lifter plate having a single fastener-retaining device.
Figure 11:
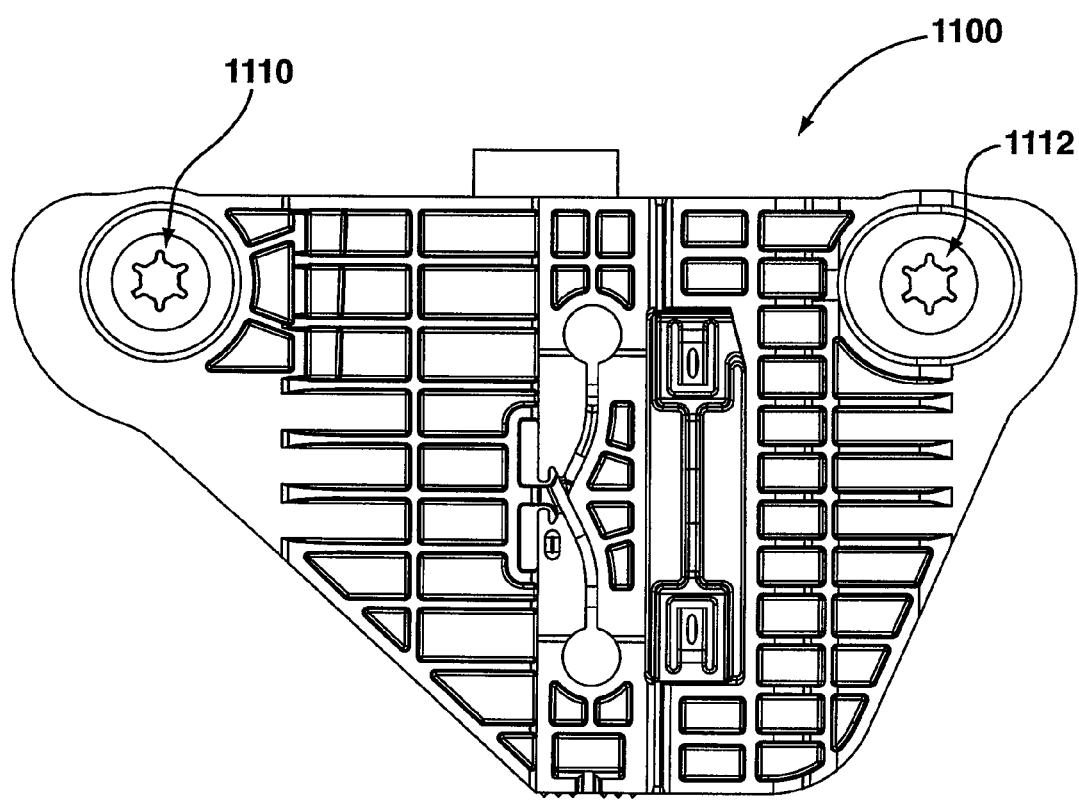
FIG. 11. is a front view of a window regulator lifter plate having two fastener-retaining devices.

FIGS. 10 and 11 illustrate an embodiment of first vehicle components as window regulator lifter plates that have fastener-retaining devices positioned on window regulator lifter plates 1000 and 1100, respectively. Window regulator lifter plates typically have fewer points of attachment than a carrier plate, for example lifter plate 1000 of FIG. 10 has a single fastener-retaining device 1010 and lifter plate 1100 has two fastener-retaining devices 1110, 1112. Maintaining torque on the fastener is more of an issue for window regulators where components can vibrate more and potentially work fasteners loose. Preferably, fastener-retaining devices 1010, 1110, and 1112 comprise a bushing, such as busing 340, previously described, that provides improved torque retention. Lifter plates 1000, 1100 are typically composed of an acetal homopolymer resin, such as that sold under the trademark Delrin by Dupont.

While the exemplary embodiments have been described herein, it is to be understood that the invention is not limited to the disclosed embodiments. The invention is intended to cover various modifications and equivalent arrangements included within the spirit and scope of the appended claims, and scope of the claims is to be accorded an interpretation that encompasses all such modifications and equivalent structures and functions.

I claim:

1. An object to be fastened by a fastener, the fastener having a shaft with a longitudinal axis and having a shoulder extending outwardly from the longitudinal axis beyond the shaft, the object comprising:
   an integrally moulded object body having a fastener retaining portion and a fastener clearance portion,
   the fastener retaining portion defining an aperture with an axis for receiving the fastener shaft, the aperture for receiving the fastener within the aperture in a pre-attachment position, the fastener retaining portion having an area of weakness being deformable for adjusting position of the longitudinal axis of the fastener laterally away from the axis and into the area of weakness of the fastener retaining portion by separation of a pair of sections of the area of weakness, and
   the fastener clearance portion being spaced about the fastener retaining portion and extending longitudinally from the fastener retaining portion to provide a mounting face for the pre-attachment position.

2. The object of claim 1, wherein the integrally moulded object body has a compression portion spaced about the fastener retaining portion such that the fastener compression portion engages the fastener shoulder as the fastener is inserted longitudinally, the compression portion having a first thickness greater than a second thickness of the fastener retaining portion.

3. The object of claim 2, wherein the fastener compression portion and fastener clearance portion are the same portion.

4. The object of claim 3, wherein the fastener retaining portion has multiple areas of the area of weakness to provide for the deformation.

5. The object of claim 2, wherein the compression portion comprises a partially overmoulded bushing exposed on one surface toward the shoulder of the fastener and on an opposing surface; and wherein the bushing has a greater compressive strength than an overmould material of the integrally moulded object body.

6. The object of claim 5, wherein the bushing is shaped to allow for flow through of the overmould material.

7. The object of claim 2, wherein the fastener retaining portion has areas of weakness to provide for deformation.

8. The object of claim 1, wherein the fastener retaining portion has multiple areas of the area of weakness to provide for the deformation.

9. The object of claim 8, wherein the multiple areas of weakness have a reduced thickness relative to a second thickness of the fastener retaining portion adjacent to the multiple areas of weakness.

10. The object of claim 8, wherein the multiple areas of weakness comprise one or more radial extensions that extend outwards.

11. The object of claim 1, wherein the object is a first vehicle component for attachment to a second vehicle component during vehicle assembly, the first vehicle component having a plurality of fastener retaining portions and a corresponding plurality fastener clearance portions.

12. The object of claim 11, wherein the first vehicle component is any one of a carrier plate and a window regulator plate, and the second vehicle component is any one of a door inner panel and a vehicle frame.

13. The object of claim 11, wherein the first vehicle component has fasteners in the pre-attachment position in each of the fastener retaining portions.

14. The object of claim 11, wherein a diameter of the fastener retaining portions corresponds with an off-center tolerance of a corresponding hole in the second vehicle component.

15. The object of claim 1 wherein the area of weakness that extends outwardly from the aperture limiting the deformation in one or more directions.

* * * * *